Feb. 5, 1952　　　F. R. DIEPEN　　　2,584,433
OPTICAL PLIERS
Filed June 1, 1948

INVENTOR.
Frederick R. Diepen
BY
ATTORNEY

Patented Feb. 5, 1952

2,584,433

UNITED STATES PATENT OFFICE 2,584,433

OPTICAL PLIERS

Frederick R. Diepen, San Jose, Calif.

Application June 1, 1948, Serial No. 30,226

1 Claim. (Cl. 81—3.6)

The present invention relates to optical pliers and is concerned more particularly with an improved plier construction for quick, easy engagement with a spectacle frame to hold the spectacle frame during adjustment thereof.

In the adjustment of the spectacle frames having a laterally extending arm which parallels but should not touch the lens, it has been common practice to remove the lenses from the frame before attempting adjustment of the arms which extend outwardly from the bridge to the side bars of the optical frame. This not only requires additional work in the assembly and disassembly of the lenses from the spectacle frame, but also renders the adjustment more difficult because the arm requires adjustment with respect to the lens itself. As a result, adjustment of this type of spectacle frame has been a long and tedious procedure.

In accordance with the instant invention, optical pliers are provided which are constructed to fit the particular frame construction, and to hold securely the various parts whose adjustment is critical, such as the nose guard, the bridge part, and the lens holding straps, and which can be inserted and used with the lens in place. Also, the pliers are constructed to be used for adjusting both the right-hand and left-hand arms of the frame.

The above and other objects of the invention are accomplished by a plier construction as illustrated in the accompanying drawings, in which.

Figure 1:
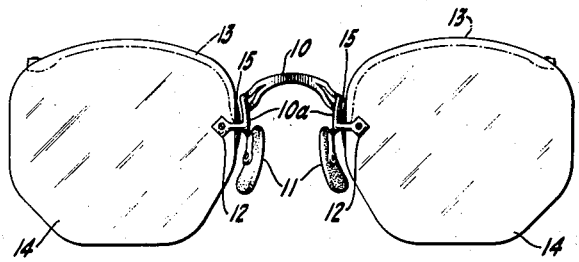
Figure 1 is a front elevational view of the character of spectacle frame with which the pliers are used.

Before describing the actual plier construction, the character of spectacle frame under consideration will be described briefly. The spectacle frame includes a bridge 10 of the usual character which is connected by vertical portions or bridge parts 10a at each end with the adjacent nose piece 11, the lens supporting strap 12 and the lateral support arm 13. The lens 14 is secured in the customary fashion in its support strap 12 against a multiple leaf spring structure 15 which is embraced by the two arms of the strap. The support arm 13 extends laterally adjacent the upper periphery of the lens 14 and is connected to the usual side piece 16 of the frame.

It is the adjustment of the support arm 13 with respect to the lens 14 and the other part of the spectacle frame in fitting the frame to a particular individual with which the pliers of the instant invention are used.

It will be seen from the above description that at one side of the bridge a construction is provided which is the complement or the mirror image of the construction at the opposite half so that the pliers to be useful in performing adjustments must be universal in that they can be used in either a left-hand or right-hand position at the respective sides of the bridge and for the right and left arms.

Figure 2:
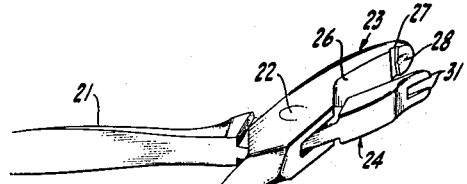
Figure 2 is a perspective view of pliers embodying the instant invention.
Figure 3:
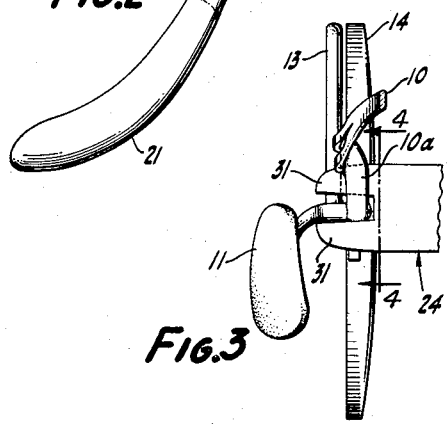
Figure 3 is a fragmentary view showing the pliers as engaged with a spectacle frame.
Figure 4:
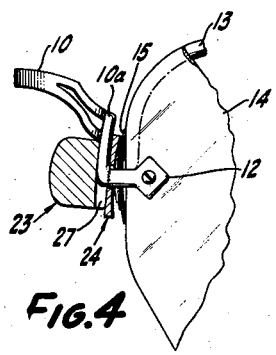
Figure 4 is another view of the pliers engaged with the spectacle frame with the jaws of the pliers shown in section. The sectional portion of the view is taken on the line 4—4 of Figure 3.
Figure 5:
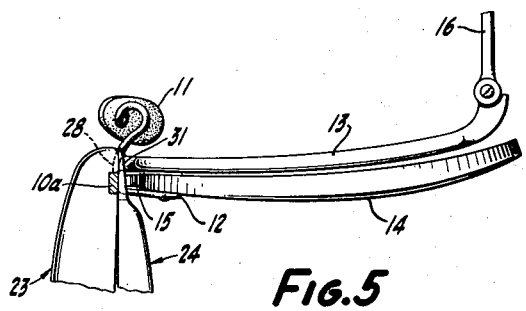
Figure 5 is a side view of the jaws of the pliers as engaged with the spectacle frame.
Figure 6:
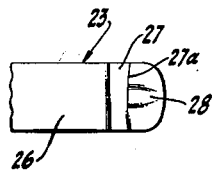
Figure 6 is an elevational view of one jaw of the pliers.
Figure 7:
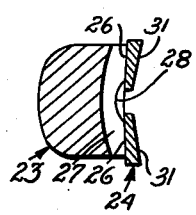
Figure 7 is an enlarged sectional view through the jaws of the pliers taken in the same plane as Figure 4.

The pliers illustrated in perspective in Figure 2 comprise the usual handles 21 which are pivoted at 22 to each other and have the respective opposed jaws 23 and 24 formed integrally therewith or suitably secured thereon. For convenience in description, the jaw 23 will be referred to as the lower jaw while the jaw 24 will be referred to as the upper jaw. The lower jaw 23, in effect, forms an anvil and is preferably of a rigid construction for strength. The jaw 23 is provided with a flat face 26 (Figures 1 and 6) which is presented to the jaw 24. At a location spaced from the end of the jaw, the flat face 26 is interrupted by a transverse groove or recess 27 with one side edge of the recess straight and the other side edge 27a convexly curved. Also, the bottom wall of the recess 27 is concavely curved. The recess 27 is provided to receive the vertical bridge part 10a and its concavity in its bottom surface conforms to the complementary curvature of the side of the bridge part (Figure 4) while the convexity of its side wall 27a conforms to another curvature of the bridge part. The depth of the groove 27 is substantially the same as or slightly less than the matching dimensions of the bridge part 10a so that when received therein, as later described, the opposing jaws 24 and 23 will firmly clamp this bridge part. Extending outwardly from the transverse groove 27 is a longitudinally extending groove 28 which tapers upwardly from adjacent the groove 27 and is adapted to provide a clearance for and to receive a portion of the nose guard 11, as seen most clearly in Figure 5.

The upper jaw 24 has a thin bifurcated end to provide respective clamping fingers 31, one being used with one side of the spectacle frame and the other with the opposite side. Each finger 31 is adapted to slide between a bridge part 10a and the adjacent spring 15 (Figures 4 and 5) while the respective fingers 31 pass to either side of the strap 12. The outer face of each finger 31 is tapered or curved to correspond to the curvature of the spring 15 so that a maximum size of finger can be provided to fit between these two parts.

From the above description it will be seen that with the pliers in place and embracing the bridge part immediately at the base of the arm and also engaging and supporting the lens straps and the nose guard, the arm 13 can be adjusted with reference to these parts and to the lens without danger of misadjusting the nose guard or the bridge and without danger of breaking the lens. It will be noted that the central portion of the recess 27 and the tapered recess 28 are used whether the pliers are in a right-hand or a left-hand position in adjusting the respective arms 13.

While I have shown and described a preferred embodiment of the invention, it will be apparent that the invention is capable of further variation and modification and its scope should be limited only by the scope of the claim appended hereto.

I claim:

Optical pliers for both right-hand and left-hand use, comprising a pair of opposed jaws, one of said jaws having a transverse groove therein and a centrally disposed tapered longitudinal groove therein of less depth than said transverse groove and extending therefrom toward the end of the jaw, and the other of said jaws having a pair of thin spaced-apart fingers with the opening therebetween coinciding with said longitudinal groove and of a length to cross said transverse groove.

FREDERICK R. DIEPEN.

REFERENCES CITED

The following references are of record in the file of this patent:

UNITED STATES PATENTS

| Number | Name | Date |
|---|---|---|
| 103,934 | Shepley | June 7, 1870 |
| 1,289,028 | Willemin | Dec. 24, 1918 |
| 1,428,029 | Hansen | Sept. 5, 1922 |
| 1,753,080 | Zwilling et al. | Apr. 1, 1930 |
| 2,301,445 | Ostertag et al. | Nov. 10, 1942 |
| 2,450,229 | Blohm | Sept. 28, 1948 |